(12) United States Patent
Blitterswijk et al.

(10) Patent No.: US 9,340,140 B1
(45) Date of Patent: May 17, 2016

(54) DRY GOODS BULK TRAILER WITH UNINTERRUPTED SLOPE SHEET

(71) Applicant: Doepker Industries Ltd., Annaheim, CA (US)

(72) Inventors: Anneke Blitterswijk, Johannesburg (ZA); Shaun L Popov, Annaheim (CA); Miles E Jorgenson, Humboldt (SK)

(73) Assignee: DOEPKER INDUSTRIES LTD., Annaheim, Saskatchewan (CA)

( * ) Notice: Subject to any disclaimer, the term of this patent is extended or adjusted under 35 U.S.C. 154(b) by 0 days.

(21) Appl. No.: 14/532,579

(22) Filed: Nov. 4, 2014

(51) Int. Cl.
*B60P 1/56* (2006.01)

(52) U.S. Cl.
CPC ....................................... *B60P 1/56* (2013.01)

(58) Field of Classification Search
CPC ............ B61D 3/20; B61D 5/00; B61D 5/002; B61D 7/02; B61D 7/06; B61D 7/12; B61D 7/26; B61D 7/32; B65D 90/623; B65D 88/02; B65D 88/128; B65D 88/30; B65D 88/62; B65D 88/64; B65D 90/12; B65D 90/18; B65D 90/20; B65D 90/582; B65D 90/587
USPC .............. 296/184.1, 186.1, 29; 414/469, 495, 414/142.8, 407, 517; 298/8 H, 29, 24, 7, 27, 298/30, 34, 17 T, 22 R, 28, 35 M, 1 B
See application file for complete search history.

(56) References Cited

U.S. PATENT DOCUMENTS

| | | | |
|---|---|---|---|
| 4,015,876 A | | 4/1977 | Hulverson et al. |
| 4,065,168 A | | 12/1977 | Gregg |
| 4,497,258 A | * | 2/1985 | Ruhmann et al. ............. 105/248 |
| 4,874,184 A | * | 10/1989 | Boyer ......................... 280/423.1 |
| D349,872 S | * | 8/1994 | Chaseling et al. ............. D12/15 |
| 5,346,286 A | * | 9/1994 | Oberle .......................... 298/8 H |
| 6,059,372 A | * | 5/2000 | McDonald et al. ........... 298/8 H |
| 6,893,075 B2 | * | 5/2005 | Fenton et al. ............... 296/181.1 |
| 7,306,291 B2 | * | 12/2007 | Hicks ............................ 298/8 H |

* cited by examiner

*Primary Examiner* — Glenn Dayoan
*Assistant Examiner* — Sunsurraye Westbrook
(74) *Attorney, Agent, or Firm* — Ade & Company Inc.; Ryan W. Dupuis; Kyle R. Satterthwaite

(57) ABSTRACT

A dry goods bulk trailer for transporting fluidic dry goods includes a frame supported on rear wheels and arranged for connection at a front end to a towing vehicle. A containment structure on the frame assembly for supporting the fluidic dry goods therein includes front and rear slope wall assemblies which slope downwardly and inwardly towards centrally located bottom discharge hoppers. Each slope wall assembly includes an inner panel, an outer panel and at least one internal structural member joined between the panels to provide sufficient structural support to enable the slope wall assembly to be only supported on the trailer frame about its perimeter. The inner panel is joined to the structural member without fasteners so that the inner surface thereof is substantially uninterrupted for easier cleanout. The outer surface of the outer panel is uninterrupted by frame members to minimize collection of snow and ice thereon.

16 Claims, 9 Drawing Sheets

DRY GOODS BULK TRAILER WITH UNINTERRUPTED SLOPE SHEET

FIELD OF THE INVENTION

The present invention relates to a dry goods bulk trailer for handling and transporting fluidic dry goods, for example grains, fertilizer, or salt, which include front and rear slope walls which direct material downwardly and longitudinally inwardly towards central bottom discharge hoppers of the trailer, and more particularly the present invention relates to a dry goods bulk trailer in which the front and rear slope walls are formed so as to be substantially uninterrupted by fasteners at the inner surface thereof and so as to be substantially uninterrupted by frame members at the outer surface thereof.

BACKGROUND

Dry goods bulk trailers are commonly used for transporting various forms of fluidic dry goods, for example grains such as wheat or barley or various other forms of particulate material such as fertilizer, salt, and the like. The typical construction of a dry goods bulk trailer includes a main frame assembly and a containment structure incorporated onto the frame. A typical containment structure includes upright side walls spanning the length of the trailer. One or more discharge hoppers are typically connected between the side walls at a central location to form the bottom side of the containment structure. A front slope wall and a rear slope wall are connected between the side walls at opposing front and rear ends so as to taper downwardly and longitudinally inwardly towards the central discharge hoppers.

Each slope wall is typically formed of one or more sheets of material which are joined together in a single layer to be connected between the side walls of the containment structure. Rivets are the preferred type of fastener for joining multiple sheets at the seams thereof. The sheets of material are typically formed of aluminum when used for transporting grains and the like. To provide added structural support to the single layer of sheeted material, typically a plurality of crossbars are provided to span the bottom side of the sheet layer in a lateral direction between the opposing side walls so as to be spaced apart at longitudinal intervals relative to one another. The single layer of sheet material forming the inner surface of the slope wall is typically joined to the crossbars using rivets or other similar fasteners due to the inability to weld aluminum to the structural members typically formed of steel. Due to the large number of fasteners required for joining sheets at respective seams and for joining the sheets to the crossbars, the resulting inner surface is interrupted by numerous protruding fastener heads upon which transported material can be caught such that the containment area is difficult to fully clean out even after the majority of material has been discharged through the bottom discharge hoppers.

A further problem arises due to the location of the crossbars which form a shelf at the exterior bottom side of the slope walls upon which road debris can become entrapped. Intermediate posts are typically also required to support the crossbars relative to the frame which add to the problem of debris collection thereon. Particularly, snow and slush are known to be collected on the crossbars and support posts, which form ice on the bottom side of the slope walls in colder climates, resulting in undesirable added weight to the trailer, which in turn limits the cargo carrying capacity. Despite the disadvantages of material collecting on the crossbars, the crossbars are typically found to be necessary for providing sufficient strength to existing slope wall constructions.

SUMMARY OF THE INVENTION

According to one aspect of the invention there is provided a dry goods bulk trailer for use with a towing vehicle for transporting fluidic dry goods, the trailer comprising:
 a frame assembly extend in a longitudinal direction between a front end and a rear end;
 a hitching element supported on the front end of the frame assembly so as to be arranged for connection to the towing vehicle for movement therewith in a forward transport direction;
 a rear wheel assembly supporting the rear end of the frame assembly thereon for rolling movement in a forward transport direction of the trailer; and
 a containment structure supported on the frame assembly for supporting the fluidic dry goods therein, the containment structure comprising:
  a pair of upright side walls extending in the longitudinal direction at laterally opposed sides of the frame assembly;
  at least one discharge hopper supported between the upright side walls at a bottom of the containment structure for selectively discharging the fluidic dry goods therefrom;
  a front slope wall supported between the upright side walls at the front end of the frame assembly so as to be sloped downwardly and longitudinally inwardly towards said at least one discharge hopper; and
  a rear slope wall supported between the upright side walls at the rear end of the frame assembly so as to be sloped downwardly and longitudinally inwardly towards said at least one discharge hopper;
 wherein at least one of the front slope wall and the rear slope wall is a slope wall assembly comprising:
  a structural base assembly supported on the frame; and
  an inner surface panel which defines a respective portion of an inner surface of the containment structure, the inner surface panel being joined to the structural base assembly substantially without fasteners.

By using an alternative mounting technique which does not rely on fasteners, for example bonding or welding to an intermediate structural layer of an overall slope wall assembly, the resulting inner surface is free of any protruding fastener heads such that bulk material being transported is less likely to become caught on the slope wall during discharge for easier cleanout.

Preferably the inner surface panel of the slope wall is an aluminum panel; however, in further embodiments other suitable materials could be used including plastics, composite material, etc.

Preferably the inner surface panel of the slope wall is a unitary, seamless panel between respective upper and lower edges and between respective laterally opposed side edges; however, in further embodiments, two or more panels could be joined by various fastening means contained between the inner and outer panels such that the inner surface panels remain flush with each other at the inner surface thereof.

Preferably the inner surface panel of the slope wall is bonded to the structural base assembly; however, in further embodiments, the inner surface panel may be welded when the inner surface panel and the structural members between the inner and outer panels are formed of similar material.

Preferably the structural base assembly comprises an outer panel defining an outer surface of the slope wall and at least one structural member supported between the outer panel and the inner surface panel. Preferably the inner surface panel is bonded to the structural member in this instance. The outer panel may also be bonded to the structural member in some embodiments.

The structural member may be: i) a plurality of horizontally extending channel members at spaced apart elevations; ii) an array of structural walls joined perpendicularly to the outer panel and the inner surface panel respectively, for example a honeycomb structure; or iii) a corrugated panel.

Preferably the structural base assembly is joined to the frame assembly only at a perimeter of the slope wall.

When the structural base assembly comprises an outer panel defining an outer surface of the slope wall, preferably the outer panel is uninterrupted by any frame members between top and bottom ends of the outer panel.

Preferably the outer panel is seamless such that the outer surface of the slope wall is substantially uninterrupted by fasteners.

Preferably both the front slope wall and the rear slope wall are constructed as described above.

When the frame assembly comprises i) a lower rear frame portion extending rearward from said at least one discharge hopper below the rear slope wall and ii) an upright rear frame portion extending upwardly from a rear end of the lower rear frame portion to a rear edge of the rear slope wall, preferably the frame assembly remains open between the rear slope wall and the lower rear frame portion between a front edge of the rear slope wall and the upright rear frame portion.

When the frame assembly comprises i) a lower front frame portion extending forward from said at least one discharge hopper below the front slope wall and ii) an upright front frame portion extending upwardly from a front end of the lower front frame portion to a front edge of the front slope wall, preferably the frame assembly remains open between the front slope wall and the lower front frame portion between a rear edge of the front slope wall and the upright front frame portion.

According to a second aspect of the present invention there is provided a dry goods bulk trailer for use with a towing vehicle for transporting fluidic dry goods, the trailer comprising:
a frame assembly extend in a longitudinal direction between a front end and a rear end;
a hitching element supported on the front end of the frame assembly so as to be arranged for connection to the towing vehicle for movement therewith in a forward transport direction;
a rear wheel assembly supporting the rear end of the frame assembly thereon for rolling movement in a forward transport direction of the trailer; and
a containment structure supported on the frame assembly for supporting the fluidic dry goods therein, the containment structure comprising:
a pair of upright side walls extending in the longitudinal direction at laterally opposed sides of the frame assembly;
at least one discharge hopper supported between the upright side walls at a bottom of the containment structure for selectively discharging the fluidic dry goods therefrom;
a front slope wall supported between the upright side walls at the front end of the frame assembly so as to be sloped downwardly and longitudinally inwardly towards said at least one discharge hopper; and
a rear slope wall supported between the upright side walls at the rear end of the frame assembly so as to be sloped downwardly and longitudinally inwardly towards said at least one discharge hopper;
wherein at least one of the front slope wall and the rear slope wall is a slope wall assembly comprising:
a structural base assembly supported on the frame; and
an inner surface panel joined to the structural base assembly so as to define a respective portion of an inner surface of the containment structure;
the structural base assembly being joined to the frame assembly only at a perimeter of the slope wall.

Preferably the structural base assembly comprises an outer panel defining an outer surface of the slope wall and the outer panel is uninterrupted by any frame members between top and bottom ends of the outer panel.

By further arranging the slope wall assembly to comprise inner and outer panels which enclose any additional structural members therebetween, the overall panel-like slope wall assembly has sufficient structural integrity to enable mounting to the remainder of the frame assembly solely at the perimeter edges of the panel assembly. This removes the necessity for any additional uprights connected between crossbars and lower portions of the trailer frame therebelow. Furthermore, this construction provides a slope wall assembly in which the outer bottom surface is uninterrupted by any frame members protruding therefrom to prevent debris from being collected thereon.

According to a third aspect of the present invention there is provided a dry goods bulk trailer for use with a towing vehicle for transporting fluidic dry goods, the trailer comprising:
a frame assembly extend in a longitudinal direction between a front end and a rear end;
a hitching element supported on the front end of the frame assembly so as to be arranged for connection to the towing vehicle for movement therewith in a forward transport direction;
a rear wheel assembly supporting the rear end of the frame assembly thereon for rolling movement in a forward transport direction of the trailer; and
a containment structure supported on the frame assembly for supporting the fluidic dry goods therein, the containment structure comprising:
a pair of upright side walls extending in the longitudinal direction at laterally opposed sides of the frame assembly;
at least one discharge hopper supported between the upright side walls at a bottom of the containment structure for selectively discharging the fluidic dry goods therefrom;
a front slope wall supported between the upright side walls at the front end of the frame assembly so as to be sloped downwardly and longitudinally inwardly towards said at least one discharge hopper; and
a rear slope wall supported between the upright side walls at the rear end of the frame assembly so as to be sloped downwardly and longitudinally inwardly towards said at least one discharge hopper;
wherein at least one of the front slope wall and the rear slope wall is a slope wall assembly comprising:
an outer panel supported on the frame and defining an outer surface of the slope wall;
an inner surface panel defining a respective slope wall portion of an inner surface of the containment structure; and
at least one structural member joined between the outer panel and the inner surface panel to as to support the outer panel and the inner surface panel in a spaced apart relationship relative to one another.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
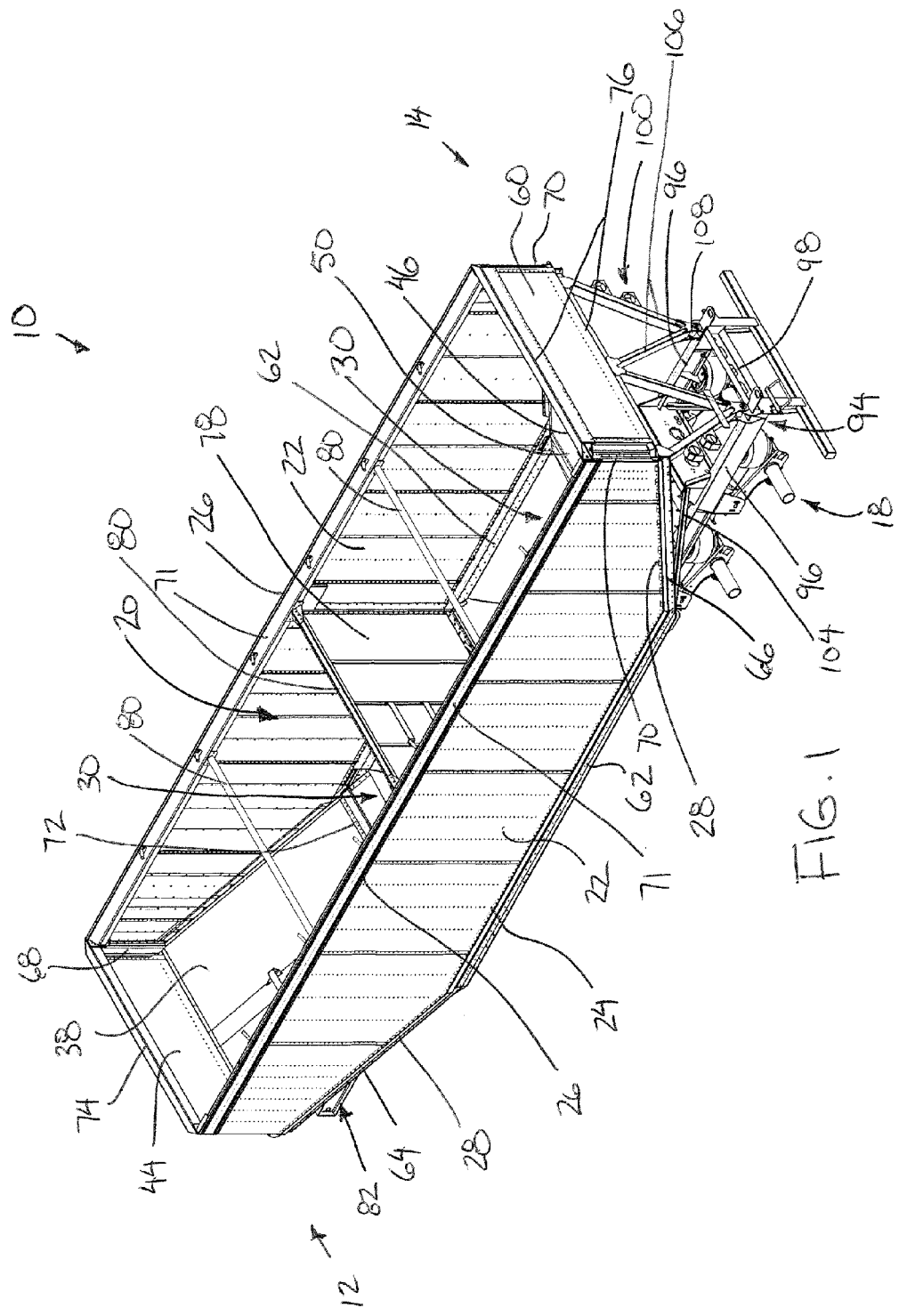
FIG. 1 is perspective view of the bulk trailer showing the top and rear of the trailer.
Figure 2:
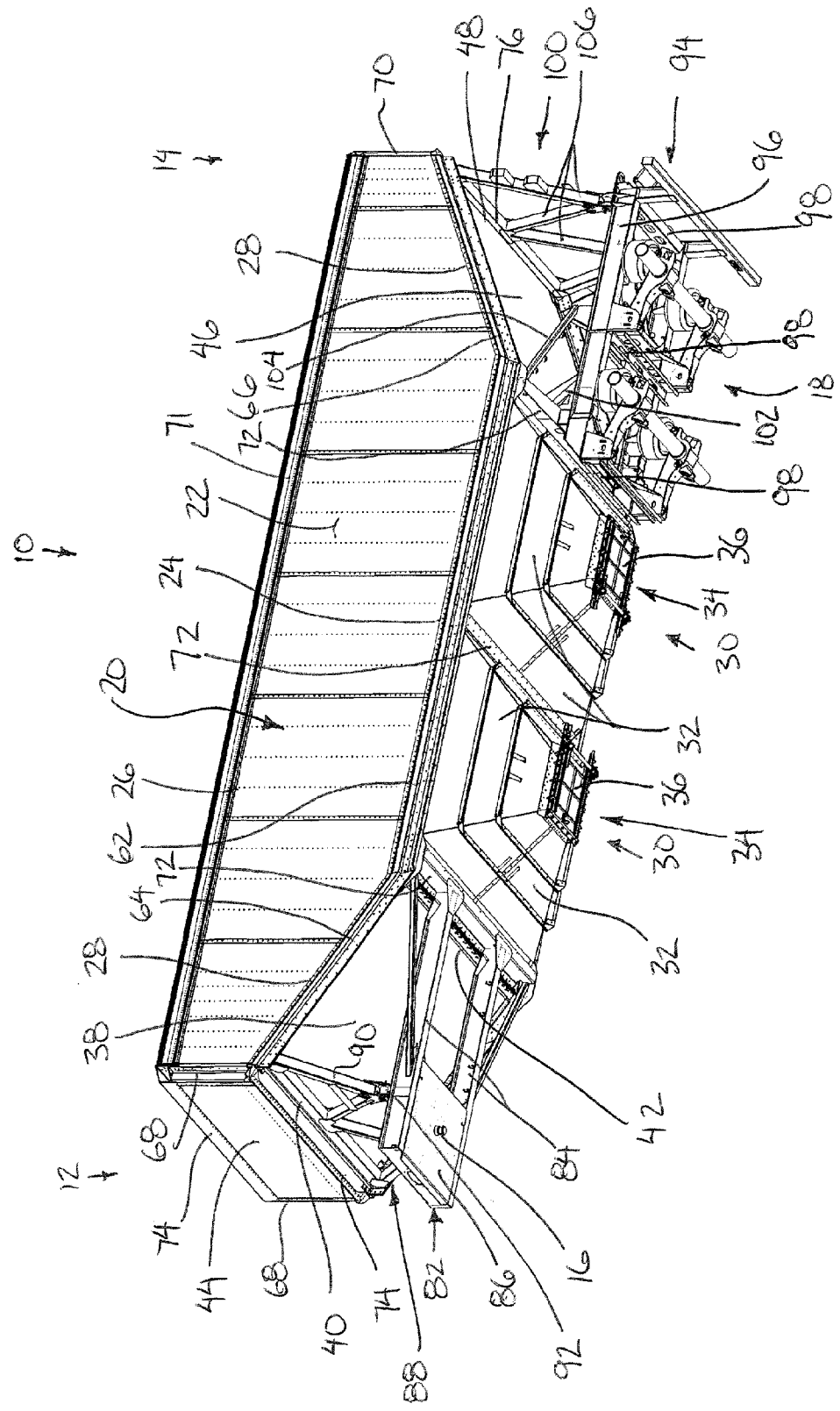
FIG. 2 is a perspective view showing the front and bottom side of the trailer.
Figure 3:
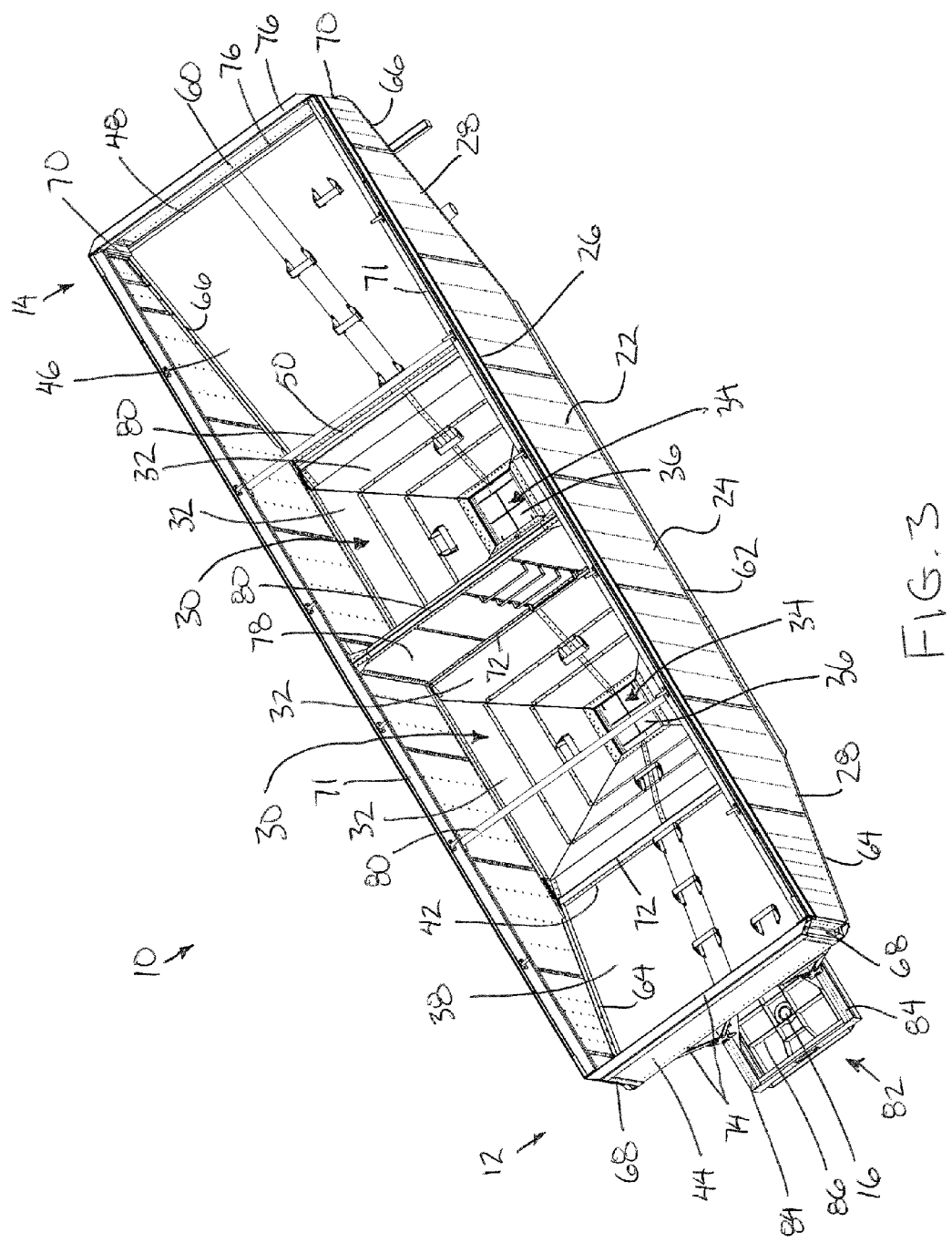
FIG. 3 is a perspective view of the bulk trailer showing the top and a portion of the front end of the trailer.
Figure 4:
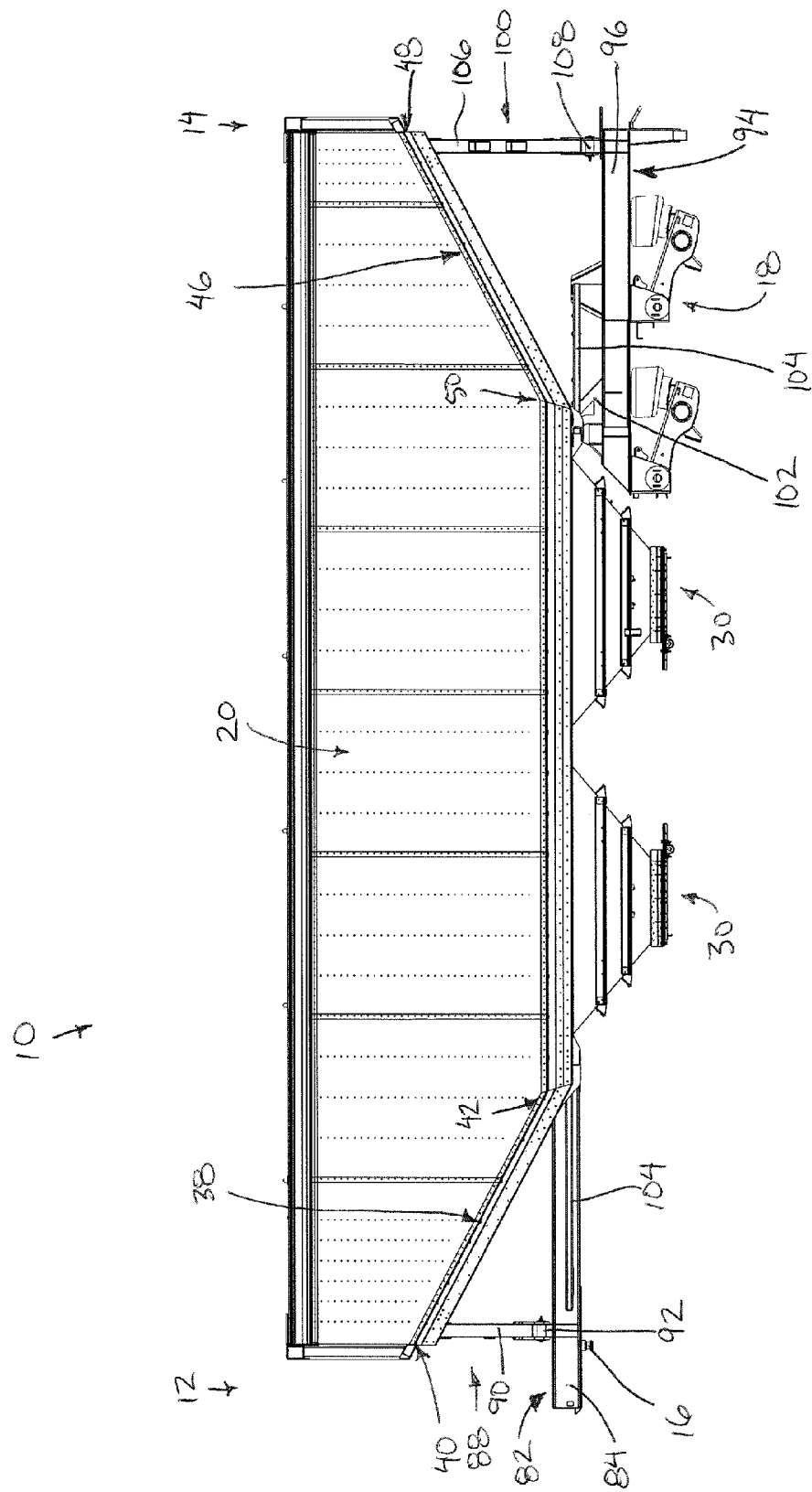
FIG. 4 is a side elevational view of the bulk trailer.
Figure 5:
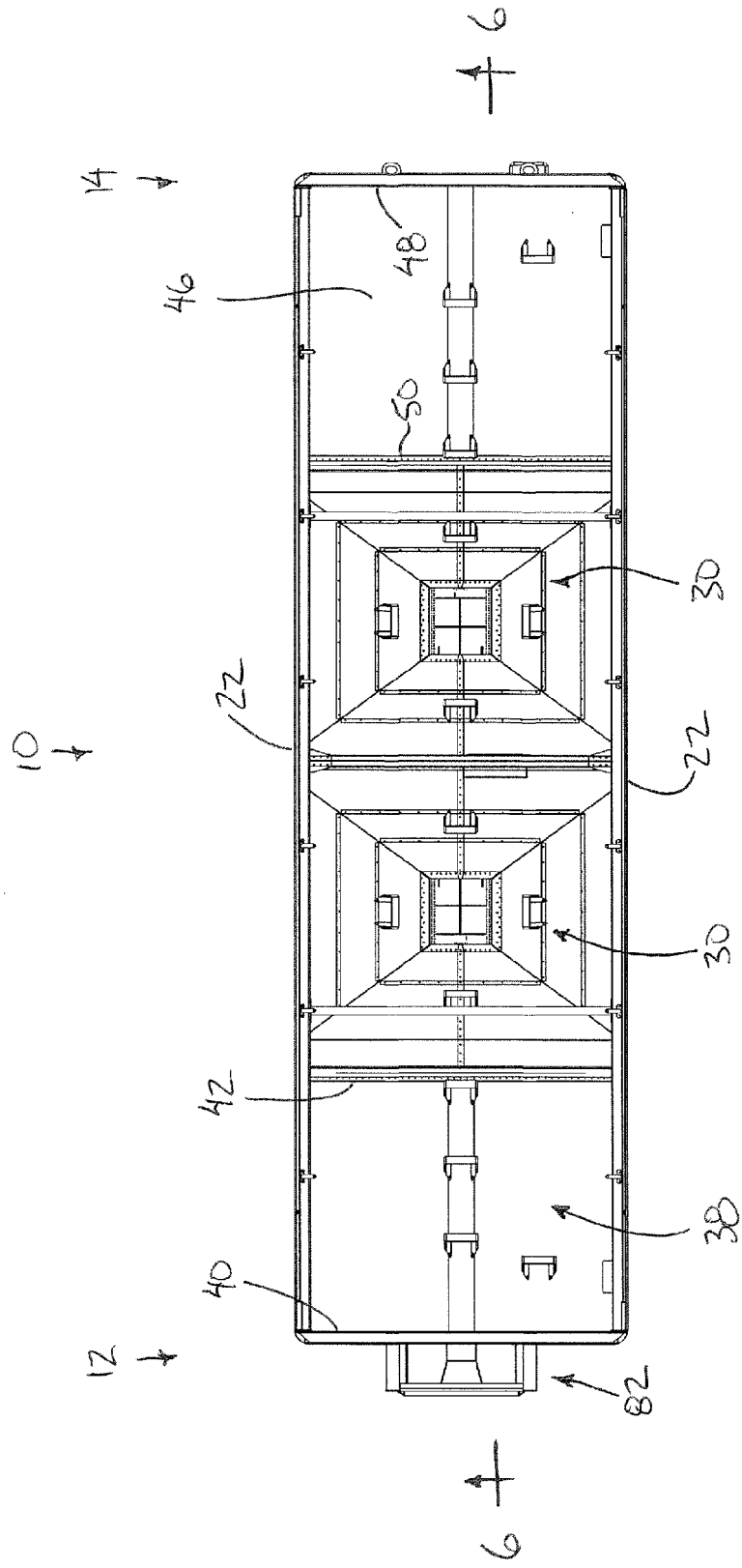
FIG. 5 is a top plan view of the bulk trailer.
Figure 6:
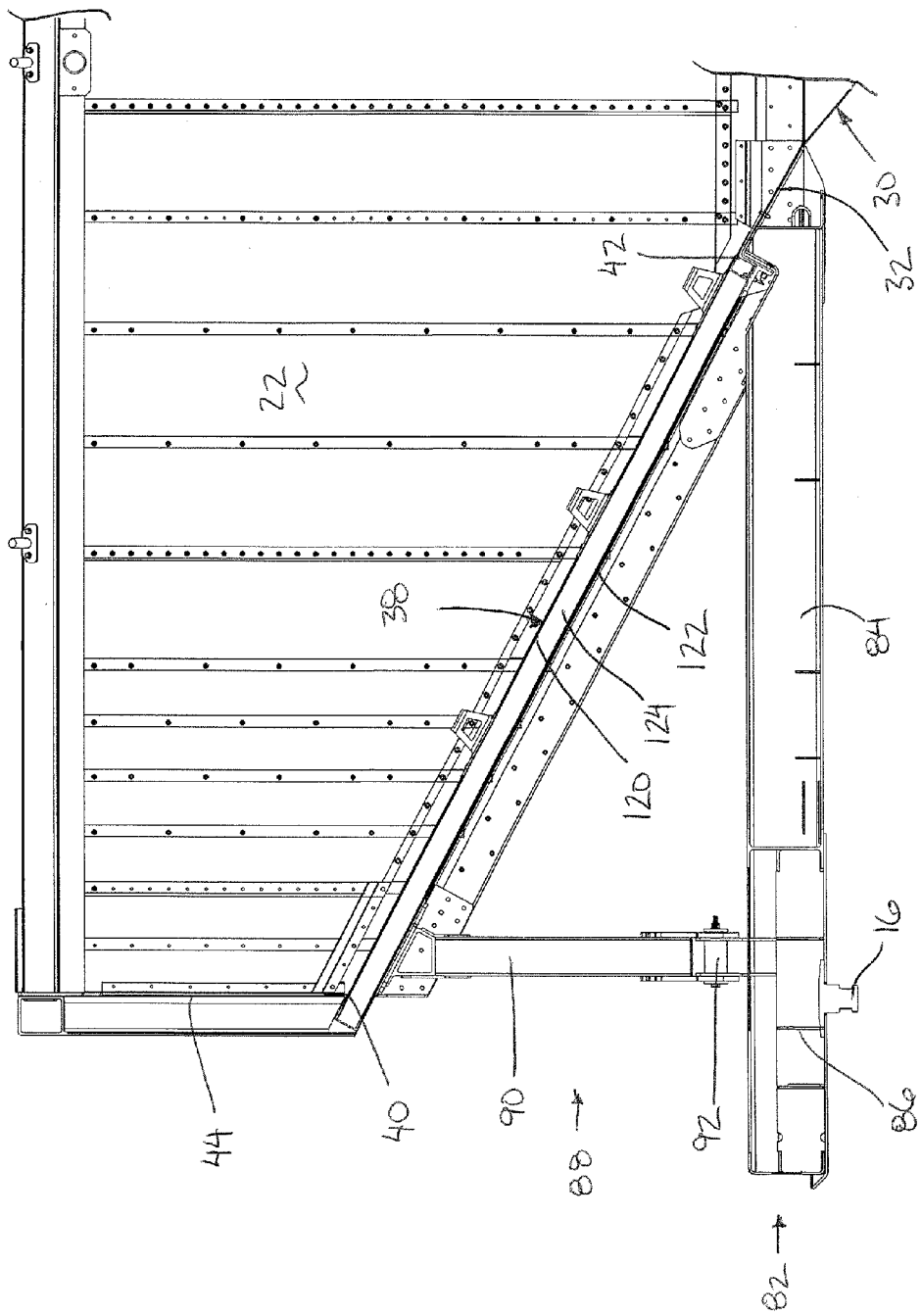
FIG. 6 is a sectional view of a forward portion of the trailer as viewed along the line 6-6 of FIG. 5.
Figure 7:
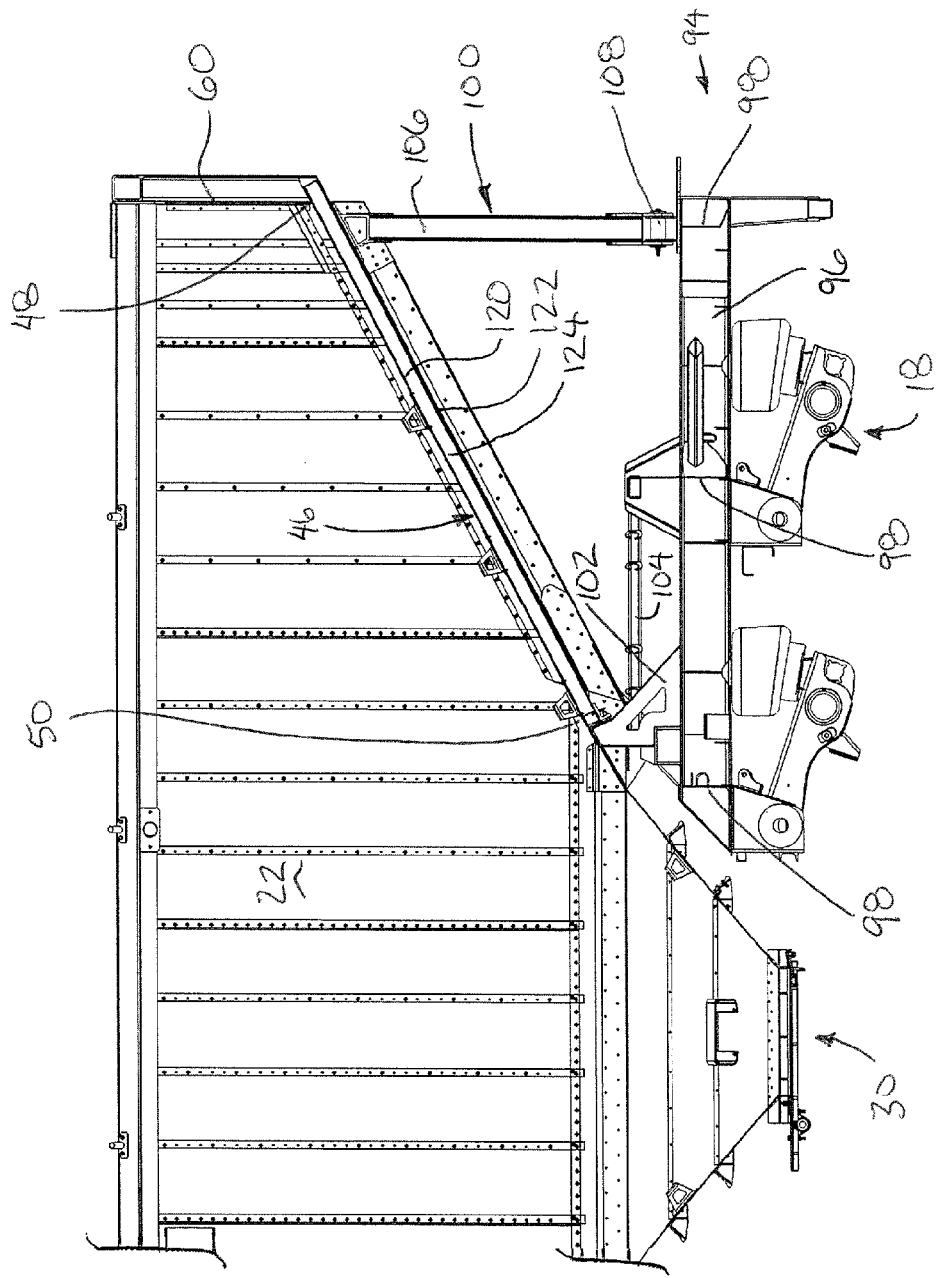
FIG. 7 is a sectional view of a rear portion of the bulk trailer along the line 6-6 of FIG. 5.

Referring to the accompanying figures, there is illustrated a dry goods bulk trailer generally indicated by reference numeral 10. The trailer 10 is particularly suited for use with a towing vehicle for movement across the ground in a forward transport direction with the vehicle. The trailer 10 includes a frame assembly which is elongate in a longitudinal direction corresponding to the forward transport direction in use from a front end 12 to a rear end 14 of the frame assembly.

A hitching element 16 is provided at the front end of the frame assembly for connection to a towing vehicle. Typically, the hitching element comprises a king pin for being received within a fifth wheel hitch plate commonly found on highway tractors.

The rear end of the frame assembly is supported on a rear wheel assembly 18 comprising a plurality of rear wheel axles supporting laterally opposed pairs of rear wheels thereon for rolling movement in the forward transport direction. A suitable rear suspension is coupled between the rear wheel axles and the frame assembly supported thereon in the usual manner.

A containment structure 20 is supported integrally on the frame assembly for containing the dry goods therein. The containment structure 20 is defined by boundary walls which are integrated with frame members of the frame assembly to define an overall unitary structure.

More particularly, the containment structure includes two side walls 22 which are vertical and spaced apart, parallel to one another at laterally opposed sides of the trailer, to span substantially the full length of the trailer while defining the full height of the containment structure. The side walls each include a bottom edge 24 which is shorter in length than a corresponding top edge 26, while being longitudinally centered relative to a top edge 26. At opposing ends of the bottom edge 24, the two side walls include sloped end portions 28 in which the bottom ends of the side walls are sloped upwardly and longitudinally outwardly from the horizontal bottom edge 24 to opposing front and rear ends of the containment structure. Opposing front and rear ends of the side walls terminate at respective vertical edges connecting between the sloped end portion 28 and the top edge 26.

The containment structure further includes two discharge hoppers 30 spanning between the two side walls at the bottom side of the containment structure such that the discharge hoppers are longitudinally in series with one another. Each discharge hopper comprises four tapered walls 32 at the front, rear and two laterally opposed sides of the hopper such that the four walls are sloped downwardly and inwardly towards a central bottom discharge opening 34. A suitable gate structure 36 spans across the bottom discharge opening so as to be operable between open and closed positions relative to the discharge opening.

The containment structure further includes a front slope wall 38 which spans between the two sloped end portions 28 at the front end of the side walls. The front slope wall is thus sloped downwardly and longitudinally inwardly from a front edge located at the front end of the containment structure at the bottom of the vertical edges of the side walls to a rear edge 42 at the bottom side of the containment structure at the forward edge of the forwardmost one of the discharge hoppers 30. A front end wall 44 spans perpendicularly to the forward transport direction so as to be connected between the front vertical edges of the two side walls, extending upwardly from the front edge 40 of the front slope wall 38.

Similarly, a rear slope wall 46 is coupled between the sloped end portions at the rear ends of the two side walls. The rear slope wall is sloped downwardly and longitudinally inwardly from a rear edge at the rear end of the containment structure at the bottom ends of the rear vertical edges, to a front edge at the bottom side of the containment structure at the rear edge of a rearward-most one of the discharge hoppers 30.

A rear end wall 60 is connected between the rear vertical edges of the two side walls to span perpendicularly to the forward transport direction and to extend upwardly from the rear edge 48 of the rear slope wall to the top end of the containment structure.

The frame assembly of the trailer generally includes two bottom rails 62 extending along the horizontal bottom edge of each of the two side walls such that the two bottom rails 62 are parallel and spaced apart from one another along the bottom side of the containment structure at laterally opposed sides of the trailer. Two front rails 64 extend upwardly and forwardly from the front ends of the two bottom rails along laterally opposed sides of the front slope wall connected thereto. Similarly, two rear rails 66 extend upwardly and rearwardly along laterally opposed sides of the rear slope wall to extend upwardly and rearwardly from the rear ends of the two bottom rails.

Two front corner posts 68 extend vertically upwardly from the front ends of the two front rails. Similarly, two rear corner posts 70 extend vertically upwardly from the rear ends of the two rear rails 66. Two top rails 71 are mounted along the two top edges of the two upright side walls such that each top rail is connected between a respective one of the front corner posts 68 and a respective one of the rear corner posts 70.

A plurality of crossbars are connected laterally between the two upright side walls to join the rails and posts on one side of the trailer to corresponding rails and posts on the other side of the trailer. More particularly, bottom crossbars 72 are connected horizontally between the front ends of the bottom rails 62, the rear ends of the bottom rails 62 and between a central location on each of the two bottom rails. Each of the discharge hoppers 30 is thus supported at opposing front and rear ends on respective ones of the bottom crossbars 72.

Two front crossbars 74 are connected between the front corner posts at respective top and bottom ends thereof. Similarly, two rear crossbars 76 are connected between the two rear corner posts at opposing top and bottom ends thereof. In this manner, the front slope wall is joined at the rear edge to a forward-most one of the bottom crossbars 72 and is joined at the front edge to a lowermost one of the front crossbars 74. Similarly, the rear slope wall 46 is joined at the front edge to a rearmost one of the bottom crossbars 72 while the rear edges join to a lowermost one of the rear crossbars 76.

Each of the rails, posts and crossbars of the frame assembly as described above generally comprises an extruded channel of rigid metal fastened at opposing ends to corresponding ones of the other rails, posts, crossbars and walls of the containment structure to form the overall frame assembly. Joining of the various walls of the containment structure adds to the structural integrity of the overall frame assembly.

In the illustrated embodiment, the containment structure further includes a divider wall 78 spanning perpendicularly to the forward transport direction between the two side walls. The divider wall spans a full height of the containment structure from a bottom edge connected to the intermediate bottom crossbar 72 between the two bottom discharge hoppers, to a top end connected to a top crossbar 80 spanning laterally between the two top rails of the frame assembly. Two additional top crossbars 80 are also shown connected between the top rails at longitudinally spaced positions between the front and rear ends of the trailer.

The frame assembly further includes a lower front frame portion 82 comprised of two parallel and spaced apart beams 84 which extend in the forward transport direction from rear ends fixed to the forwardmost bottom crossbar 72. Lateral spacing between the two beams 84 is narrower than the lateral distance between the two side walls of the container such that the beams are spaced laterally inwardly from the respective bottom rails of the frame assembly.

The lower front frame portion formed by the two beams extends horizontally forward at a location below the front slope wall to a cross frame 86 connected between the beams adjacent the forward ends thereof upon which the hitching element is supported. The forward ends of the beams are joined together by the cross frame and terminate at a location which is longitudinally forward relative to the front end wall of the containment structure.

The frame assembly further includes an upright front frame portion 88 comprised of a plurality of upright angled brace members 90 which are mounted in a common vertical plane perpendicular to the forward transport direction to extend downwardly from the lowermost front crossbar 74 at the front end of the containment structure to the lower front frame portion 82 at a location spaced rearward from the front end thereof. The brace members 90 are arranged in two generally V-shaped pairs such that the bottom ends of each pair of brace members are coupled together at a respective apex which is in turn coupled by a common bushing 92 to a top side of a respective one of the beams 84 of the lower front frame portion 82. The top ends of the two outermost brace members 90 are coupled to laterally opposed ends of the lower front crossbar 74 while the upper ends of the two innermost brace members 90 are joined together at a central location on the lower front crossbar 74.

The rear end of the frame assembly similarly includes a lower rear frame portion 94 also comprised of two beams 96 which are parallel and spaced apart from one another and extend horizontally rearward from the rearmost bottom crossbar 72 at a location spaced below the rear slope wall. The two beams 96 are maintained fixed and spaced apart relative to one another by three cross members 96 connected perpendicularly therebetween at longitudinally spaced positions. The front ends of the two beams 96 are mounted below the rearmost bottom crossbar 72 to extend rearwardly therefrom to respective rear ends which lie in a substantially common vertical plane with the rear end wall of the containment structure thereabove.

To provide additional structural support between the lower rear frame portion and the remainder of the frame assembly, gussets 102 of additional material are connected between the rear side of the rearmost bottom crossbar 72 and the top side of each of the two beams 96 supported therebelow. Additionally two angle support arms 104 are mounted between an intermediate one of the cross members 98 at the rear ends thereof and the rear ends of the two bottom rails at the forward ends thereof. Similarly to the lower front frame portion, the two beams 96 have a lateral distance therebetween which is narrower than the two bottom rails such that each beam 96 is connected to the lower bottom crossbar 72 at a location spaced laterally inwardly from the connection to the respective bottom rail.

An upright frame portion 100 lies in the common vertical plane of the rear end wall such that the upright frame portion is connected between the lowermost rear crossbar 76 and the rear ends of the two beams 96. The upright rear frame portion 100 also comprises a plurality of upright angled brace members 106 lying in the common vertical plane connected between the rear ends of the beams 96 and the lowermost rear crossbar. The four angled brace members 106 are also arranged into V-shaped pairs such that the bottom ends of the angled brace members 106 of each pair are joined at a common apex which is in turn coupled by a bushing 108 to the rear end of a respective one of the beams 96. The top ends of the two outermost brace members 106 are joined at laterally opposed ends of the lower rear crossbar 76. The top ends of the two innermost brace members 106 are coupled together at a central location on the lower rear crossbar 76.

In this arrangement, both the front and rear slope walls have a resulting structure where they are supported only about the perimeter thereof by the front rails 64, the rear rails 66, and respective ones of the crossbars. The entire area below the slope walls up to the horizontal lower frame portions remains open and unobstructed by any frame members between the front and rear edges of the slope walls. More particularly, the area below each slope wall remains open and unobstructed from the corresponding front or rear edge of the discharge hoppers to the corresponding upright frame portions at opposing front and rear ends of the containment structure. In the illustrated embodiment, the outer surface of the slope walls is further provided as a single seamless surface uninterrupted by any fasteners or other protruding structures.

Although various embodiments of the slope wall assembly structures are illustrated in the accompanying figures, the common features of the various embodiments will now be described. In each instance, the front or rear slope wall comprises an assembly of an inner panel 120 which defines an inner surface of the slope wall, and the outer panel 122 which defines an outer surface of the assembly, and one or more structural members 124 joined between the inner and outer panels such that the panels are maintained parallel and spaced apart from one another, being joined together as a single unitary structural assembly. The structural members are joined to the inner panel without using fasteners, for example by bonding or welding such that the joining of the inner panel to the structural base assembly of the structural members 124 and outer panel 122 does not result in any unwanted fastener heads protruding into the interior surface of the containment area.

The inner panel comprises an aluminum panel which may be formed either as a single, seamless, unitary sheet spanning between opposed side edges and opposed front and rear edges. Alternatively, when multiple sheets of material are provided to form the inner panel, the sheets are joined to one another by overlapping seams bonded or welded together without fasteners with the inner surface remaining substantially flush and with the seams being oriented to extend longitudinally between the front and rear edges of the panel.

In the illustrated embodiment, the inner panel of each slope sheet is further provided with a plurality of steps 126 at longitudinally spaced positions between the front and rear edges thereof. Each step 126 is a U-shaped bar having two legs joined at bottom ends to the inner panel and a crossbar connected between the legs at a location spaced upwardly from the inner panel to prevent accumulation of material thereon. The legs each comprise flat plate material which is substantially vertical and oriented in the transport direction to further prevent accumulation of material thereon. The legs may be joined to the inner panel with fasteners, however the small number of fasteners used does not considerably hamper cleanout efforts.

The outer panel can be formed of a single unitary and seamless sheet of material joined to the one or more structural members 124. Alternatively, the outer panel may be formed of multiple sheets which are either joined by various fasteners such as rivets, by welding, or by bonding to the structural members 124. Even in the event of some fasteners being used to join the outer panel to the structural members, any resulting fasteners are not joined to the inner panel and do not substantially protrude from the outer surface of the outer panel so as to prevent the collection of road debris thereon. In either instance, the structural members 124 remain enclosed between the inner and outer panels such that the outer surface of the outer panel remains uninterrupted by any protruding frame members and the like between opposing front and rear edges or opposing side edges.

Figure 8:
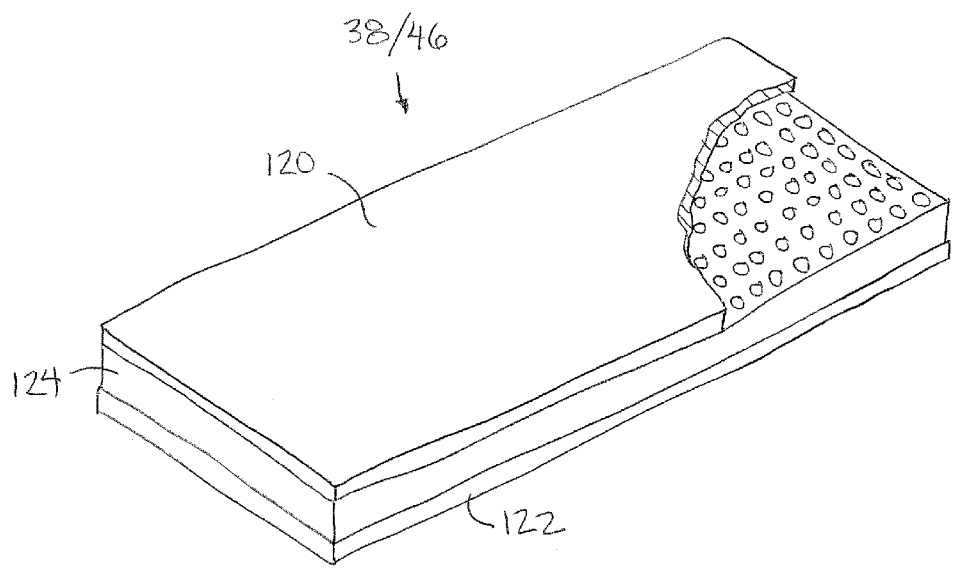
FIG. 8 is a perspective view of a partially assembled slope wall according to a first embodiment of the present invention.

Turning now to the embodiment of FIG. 8, in this instance, the structural member 124 comprises a honeycomb formed of an array of structural walls extending perpendicularly between the inner and outer panels so as to define a uniform array of cells between the structural walls. The resulting structural member 124 formed by the structural walls is joined to the inner and outer panels, for example by bonding or welding and the like.

Figure 9:
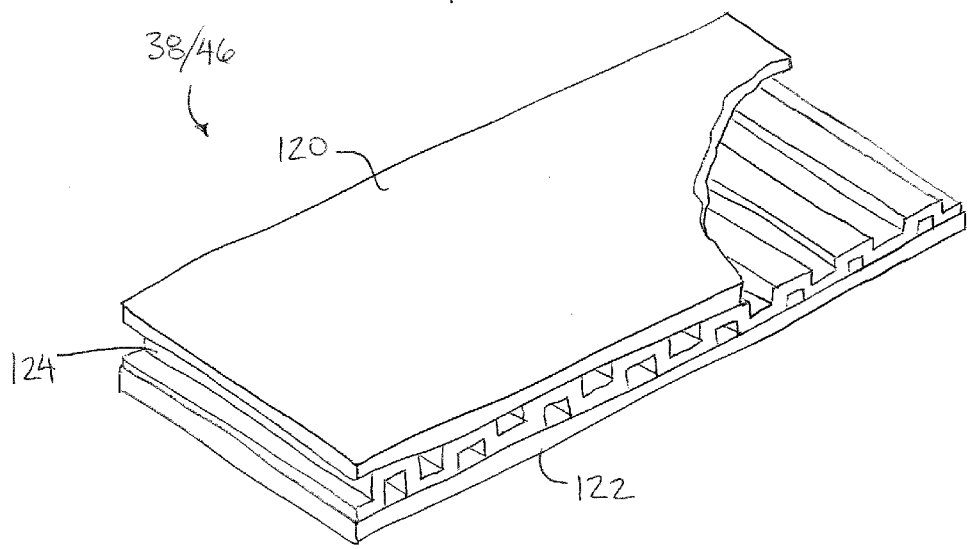
FIG. 9 is a partly sectional perspective view of a second embodiment of the slope wall.

Turning now to the embodiment of FIG. 9, the structural member 124 in this instance may comprise a corrugated sheet. In this instance, the corrugated sheet comprises a plurality of parallel folds and bends which are oriented to span in the lateral direction perpendicularly to the forward transport direction of the trailer.

Figure 10:
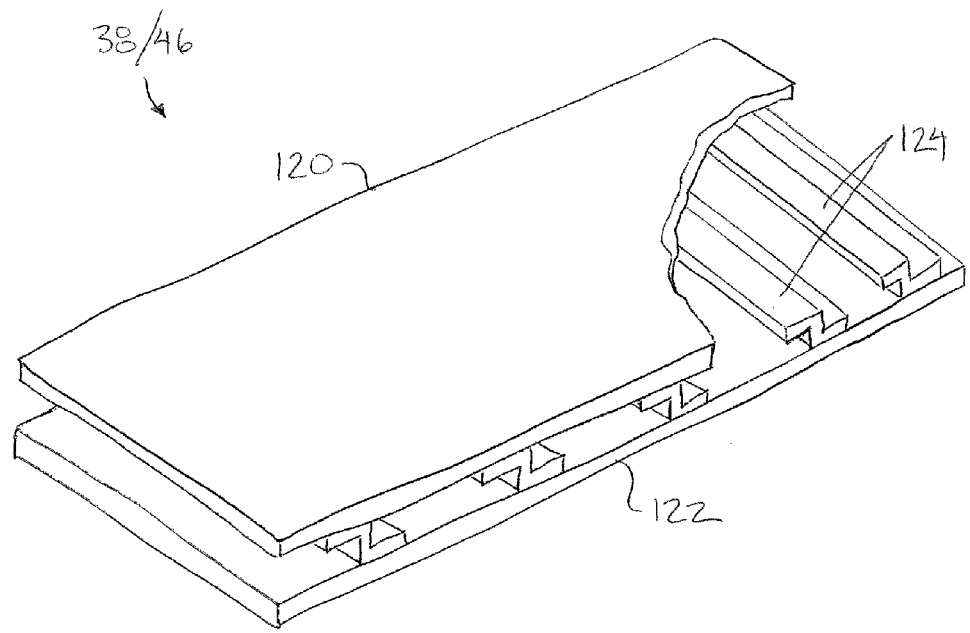
FIG. 10 is a partly sectional perspective view of a third embodiment of the slope wall.
Figure 11:
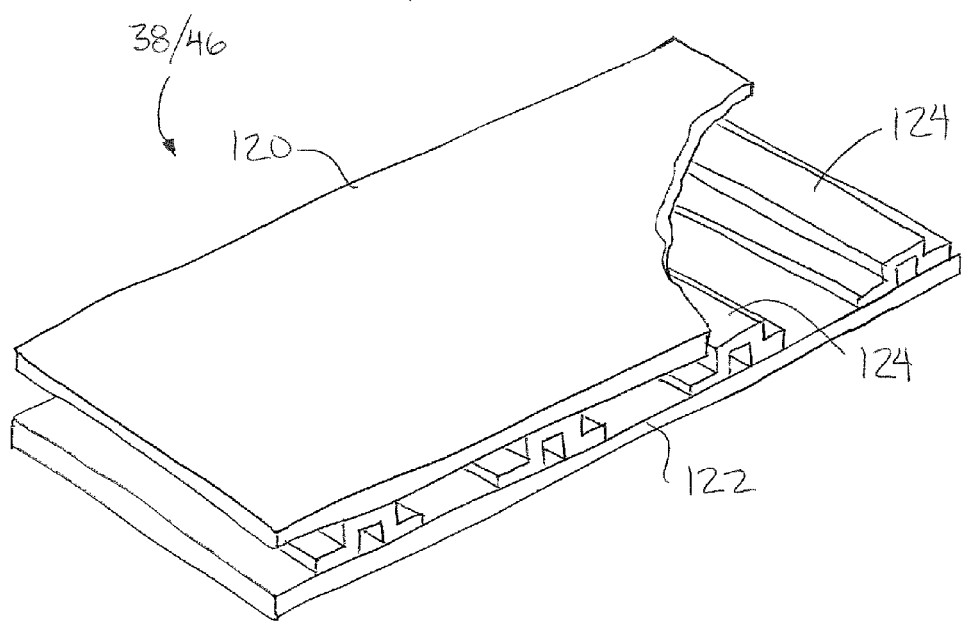
FIG. 11 is a perspective view of a fourth embodiment of the slope wall.

As shown in FIGS. 10 and 11, the structural members 124 may comprise a plurality of separate channels which are again mounted to extend in the lateral direction between opposing sides of the slope wall assembly at longitudinally spaced positions. Each channel is made up of a plurality of folds or bends such that the bends are oriented in the lateral direction that the channel extends.

Turning now more particularly to the embodiment of FIG. 10, the channel in this instance comprises a Z-shaped bar comprising a top flange joined parallel against the inner panel, a bottom flange joined parallel against the outer panel and an intermediate flange spanning perpendicularly between the top and bottom flanges.

Turning now to the embodiment of FIG. 11, the channels in this instance are generally U-shaped having a central flange joined to one of the panels, to leg portions standing between the two panels perpendicularly thereto and two mounting flanges joined perpendicularly to each of the leg portions to lie parallel against the opposing panel relative to the central flange.

In either embodiment, the one or more structural members 124 may be formed of any suitable rigid plastic, metal or composite material, for example Kevlar or fibreglass. In each instance, the one or more structural members 124 are joined to the inner panel without fasteners, for example by bonding or welding while being joined to the outer panel by any suitable means including use of fasteners, bonding, or welding. The joining technique is selected such that the inner panel 120 which defines the inner surface that fully spans a width and a length of the slope wall, the outer panel 122 which defines the outer surface that fully spans a width and a length of the slope wall, and the one or more structural members 124 enclosed therebetween collectively define a unitary structural assembly which permits being supported solely about the perimeter of the assembly on the remainder of the frame assembly of the trailer. The outer panel is thus uninterrupted by and unsupported by frame members at the outer surface between opposing top and bottom end portions of the outer panel and between opposing side portions of the outer panel.

The resulting trailer as described above, provides a smooth rivetless surface on the cargo side of the containment structure by use of a composite two panel assembly bonded at the inner panel portion thereof at the front and rear slope walls. Furthermore a smooth surface is provided on the underside of the slope wall, whether rivetless or other, that removes visible cross members and accompanying supports to eliminate the build-up of snow or ice thereon. The elimination of cross members and supports on the exterior is permitted due to the construction of the bonded or laminated panel assembly using adhesives or adhesive film or tape in the creation of a laminate structural member for the front and rear slope walls.

Since various modifications can be made in my invention as herein above described, it is intended that all matter contained in the accompanying specification shall be interpreted as illustrative only and not in a limiting sense.

The invention claimed is:

1. A dry goods bulk trailer for use with a towing vehicle for transporting fluidic dry goods, the trailer comprising:
   a frame assembly extend in a longitudinal direction between a front end and a rear end;
   a hitching element supported on the front end of the frame assembly so as to be arranged for connection to the towing vehicle for movement therewith in a forward transport direction;
   a rear wheel assembly supporting the rear end of the frame assembly thereon for rolling movement in a forward transport direction of the trailer; and
   a containment structure supported on the frame assembly for supporting the fluidic dry goods therein, the containment structure comprising:
      a pair of upright side walls extending in the longitudinal direction at laterally opposed sides of the frame assembly;
      at least one discharge hopper supported between the upright side walls at a bottom of the containment structure for selectively discharging the fluidic dry goods therefrom;
      a front slope wall supported between the upright side walls at the front end of the frame assembly so as to be sloped downwardly and longitudinally inwardly towards said at least one discharge hopper; and a rear slope wall supported between the upright side walls at the rear end of the frame assembly so as to be sloped downwardly and longitudinally inwardly towards said at least one discharge hopper;

wherein at least one of the front slope wall and the rear slope wall is a slope wall assembly comprising:

an outer panel supported on the frame, fully spanning a width and a length of the slope wall and defining an outer surface of the slope wall;

an inner surface panel, fully spanning a width and a length of the slope wall and defining a respective slope wall portion of an inner surface of the containment structure; and at least one structural member joined between the outer panel and the inner surface panel to as to support the outer panel and the inner surface panel in a spaced apart relationship relative to one another as a unitary structural assembly.

2. The trailer according to claim 1 wherein the inner surface panel of said at least one of the front slope wall and the rear slope wall is an aluminum panel.

3. The trailer according to claim 1 wherein the inner surface panel of said at least one of the front slope wall and the rear slope wall is a unitary, seamless panel between respective upper and lower edges and between respective laterally opposed side edges.

4. The trailer according to claim 1 wherein the inner surface panel of said at least one of the front slope wall and the rear slope wall is bonded to the structural base assembly.

5. The trailer according to claim 1 wherein said at least one structural member comprises a plurality of horizontally extending channel members at spaced apart elevations.

6. The trailer according to claim 1 wherein said at least one structural member comprises an array of structural walls joined perpendicularly to the outer panel and the inner surface panel respectively.

7. The trailer according to claim 1 wherein said at least one structural member comprises a corrugated panel.

8. The trailer according to claim 1 wherein the inner surface panel is bonded to said at least one structural member.

9. The trailer according to claim 1 wherein the outer panel is bonded to said at least one structural member.

10. The trailer according to claim 1 wherein the structural base assembly is joined to the frame assembly only at a perimeter of the slope wall.

11. The trailer according to claim 1 wherein the outer panel is seamless such that the outer surface of the slope wall is substantially uninterrupted by fasteners.

12. The trailer according to claim 1 wherein said at least one of the front slope wall and the rear slope wall includes the rear slope wall.

13. The trailer according to claim 12 wherein the frame assembly comprises a lower rear frame portion extending rearward from said at least one discharge hopper below the rear slope wall and an upright rear frame portion extending upwardly from a rear end of the lower rear frame portion to a rear edge of the rear slope wall, the frame assembly being open between the rear slope wall and the lower rear frame portion between a front edge of the rear slope wall and the upright rear frame portion.

14. The trailer according to claim 1 wherein said at least one of the front slope wall and the rear slope wall includes the front slope wall.

15. The trailer according to claim 14 wherein the frame assembly comprises a lower front frame portion extending forward from said at least one discharge hopper below the front slope wall and an upright front frame portion extending upwardly from a front end of the lower front frame portion to a front edge of the front slope wall, the frame assembly being open between the front slope wall and the lower front frame portion between a rear edge of the front slope wall and the upright front frame portion.

16. The trailer according to claim 1 wherein the outer panel is unsupported by frame members at the outer surface between opposing top and bottom end portions of the outer panel and between opposing side portions of the outer panel.

* * * * *